United States Patent [19]

Yamaguchi et al.

[11] Patent Number: 5,220,435
[45] Date of Patent: Jun. 15, 1993

[54] MUSE SIGNAL DIGITAL RECORDING/REPRODUCING APPARATUS AND OPERATING METHOD THEREOF

[75] Inventors: Takayoshi Yamaguchi, Nagareyama; Junichi Aoki, Kashiwa; Futoshi Shimizu, Nagareyama, all of Japan

[73] Assignee: Sharp Kabushiki Kaisha, Osaka, Japan

[21] Appl. No.: 845,039

[22] Filed: Mar. 3, 1992

[30] Foreign Application Priority Data

Mar. 4, 1991 [JP] Japan ............................ 3-037565

[51] Int. Cl.$^5$ .................. H04N 5/76; H04N 5/92
[52] U.S. Cl. ............................ 358/335; 358/138; 358/11; 358/310; 358/320; 358/339; 358/330; 360/32
[58] Field of Search ............... 358/310, 335, 330, 320, 358/337, 339, 343, 11, 12, 138; 360/18, 20, 32

[56] References Cited

U.S. PATENT DOCUMENTS

| | | | |
|---|---|---|---|
| 4,916,686 | 4/1990 | Bailey | 358/342 |
| 4,963,992 | 10/1990 | Doi et al. | 358/335 |
| 5,038,219 | 8/1991 | Yamashita et al. | 358/310 |
| 5,063,445 | 11/1991 | Nishizawa et al. | 358/12 |

FOREIGN PATENT DOCUMENTS

| | | |
|---|---|---|
| 0377471 | 1/1990 | European Pat. Off. . |
| 0404383 | 12/1990 | European Pat. Off. . |
| 4014744 | 11/1990 | Fed. Rep. of Germany . |
| WO9103909 | 3/1991 | PCT Int'l Appl. . |
| 2233489 | 1/1991 | United Kingdom . |

OTHER PUBLICATIONS

European Search Report.
"Muse Signal Digital Recording/Reproducing System" Yoshihiko Osawa, ITEJ Technical Report vol. 13, No. 55, pp. 25-30 VTR'89-16C Oct. 1989.

Primary Examiner—Tommy P. Chin
Assistant Examiner—Khoi Truong

[57] ABSTRACT

A MUSE signal recording/reproducing apparatus for converting a MUSE signal into a digital signal and for recording/reproducing the same, including an HDVTR, a signal processing device, and a control device for controlling the HDVTR and the signal processing device. The HDVTR is a device capable of recording/reproducing effective lines and effective picture elements of a high definition television signal. The signal processing device performs A/D conversion and multiplex processing of two synchronizing MUSE signals to convert the same into frequency double that of a MUSE signal, and further performs rate conversion corresponding to recording frequency and phase of the HDVTR. The HDVTR records the rate-converted data.

14 Claims, 8 Drawing Sheets

MUSE SIGNAL DIGITAL RECORDING/REPRODUCING APPARATUS AND OPERATING METHOD THEREOF

BACKGROUND OF THE INVENTION

1. Field of the Invention

The present invention relates to a MUSE (Multiple Sub-Nyquist Sampling Encoding) signal digital recording/reproducing apparatus for recording/reproducing MUSE signals in digital VTRs and an operation method thereof, and particularly to an adaptor for converting a MUSE signal in correspondence to recording/reproducing formats of a high definition television signal recording/reproducing device (hereinafter, referred to as a HDVTR) capable of digitally recording a high definition television signal.

2. Description of the Background Art

The MUSE system has been recently developed and the test broadcasting of high definition television signals has been started with the development of the MUSE system.

The MUSE system is a system in which a high definition television signal is compressed to a signal with baseband width of approximately 8 MHz. A signal converted according to the system is referred to as a MUSE signal.

For recording/reproducing a MUSE signal, two kinds of methods are presently proposed. One of them is a method for recording/reproducing a MUSE signal as it is by a VTR dedicated to a MUSE signal, and another one is a method in which the rate of a MUSE signal is converted into the input format of a digital VTR of the standard system to be recorded, and when reproducing, conversion opposite to that in recording is performed to produce a MUSE signal. The former method can record a MUSE signal as it is, so that the recorded signal can be extracted to evaluate the quality of the inputted MUSE signal. For manufacturing a VTR dedicated to MUSE signal, however, great amounts of time for development and cost are required. Accordingly, with the latter method less time for development and less cost are required as compared to the former one. The latter method is disclosed in "ITEJ Technical Report Vol13. No.50 p.p.25-30, VTR' 89-16C Oct. 1989".

FIG. 10 is a simplified block diagram of the recording system described in the paper. The recording system includes a digital VTR (hereinafter, referred to as a VTR 50) of the SMPTE-D-1 standard, and an adaptor 51 for converting a MUSE signal so that it conforms to the input rate of VTR 50. A MUSE signal dealt with herein is converted digital data of 16.2 MHz, 10 bits.

Adaptor 51 includes an interface portion 52, a rate converting portion 53 and a system controller 54. Interface portion 52 performs re-arrangement of data corresponding to the standard of VTR 50 and also adds a control code for controlling VTR 50. Rate converter 53 converts the rate between an input source of MUSE signal and interface portion 52. System controller 54 produces a signal for recording an inputted MUSE signal in VTR 50 in synchronization with VTR 50 and all control signals used inside adaptor 51.

FIG. 11 is a diagram for describing a rate converting operation of adaptor 51. Referring to the figure, M denotes a higher bit and L denotes a lower bit. Firstly, a MUSE signal of 16.2 MHz, 10 bits is applied to rate converter 53 and converted into digital data having the input rate of interface portion 52 (13.5 MHz 8 bits×1, 6.75 MHz 8 bits×2). The three time-divided digital data are converted into 27 MHz 8 bits (the input rate of VTR 50) by interface portion 52 and then provided to VTR 52.

As described above, since a MUSE signal of 16.2 MHz×10 bits can be converted into digital data of 27 MHz×8 bits which is the input rate of VTR 50, even when the bit lengths of a recorded signal of VTR and a MUSE signal are different, the MUSE signal can be recorded in recording tape.

While frame frequency of a MUSE signal is 30 MHz, frame frequency in the NTSC system is 29.97 MHz. Since frame frequencies of the two are thus different, respective frames of MUSE signal recorded in VTR 50 are simply handled as continuing signals as shown in FIG. 12. Also, regarding information amount, while it is 20M bite/second in a MUSE signal, it is 21.57M bite/second in a recorded signal of VTR 50. Accordingly, the capacity of VTR 50 is larger and data can be recorded without loss. Furthermore, it is described in the above-identified paper that a signal of double rate (32.4 MHz×10 bits) can be recorded/reproduced by adding VTR 50 and a frame memory board.

The adaptor is enough to simply record/reproduce a MUSE signal and to be used as a MUSE source. However, as described above, since frame frequencies of a MUSE signal and a recorded signal of VTR differ from each other, frame lock is impossible. Therefore, coupling VTR 50 to a simulator for video signals, in processing recorded data in frame units, or in evaluating quality of a MUSE signal on the basis of recorded data, or in evaluating a system of data compression, a problem occurs.

The inventors of the present invention focused their attention on usage of a so-called HDVTR capable of recording with the same frame frequency as a MUSE signal and having a large recording/reproducing capacity. The HDVTR, however, uses only effective lines and effective picture elements of a high definition television signal as record information, so that it has a problem that a MUSE signal having different numbers of picture elements and lines from those of baseband can not be directly recorded.

SUMMARY OF THE INVENTION

It is an object of the present invention to provide a MUSE signal digital recording/reproducing apparatus capable of recording/reproducing a MUSE signal in a framelock state using a HDVTR and also capable of recording/reproducing with a rate higher than conventional cases.

Briefly stated, the present invention is a MUSE signal digital recording/reproducing apparatus which converts a MUSE signal into a digital signal and records the same, and reproduces the recorded data, including a recording/reproducing device, a first A/D converter, a frequency converter, a second A/D converter, a selector, a rate converter, and an extracting device.

The recording/reproducing device can digitally record a high definition television signal. The first A/D converter A/C converts synchronizing MUSE signals of a first type with a sample signal in synchronization with the MUSE signal and predetermined quantization characteristics. The frequency converter applies multiplex processing to the data A/D converted by the first A/D converter to convert it into doubled frequency. The second A/D converter A/D converts a MUSE signal of a second type with a sample signal of frequency which is double of the sample signal. The selector selects one of the signal multiplex-processed by the frequency converter and an output of the second A/D converter. The rate converter converts a rate of the selected output corresponding to recording/reproducing frequencies and phase of the recording/reproducing device and the converted data is recorded into the recording/reproducing device. The extracting device performs an operation opposite to that of the recording operation for the data recorded in the recording/reproducing device to extract MUSE signals of the first type or a MUSE signal of the second type.

In operation, a recording/reproducing device capable of digitally recording effective lines and effective picture elements of a high definition television signal has a recording capacity which is enough to record/reproduce a MUSE signal with a rate higher than conventional cases. However, since the recording/reproducing device can not record/reproduce a MUSE signal having different numbers of picture elements and lines than those of a baseband signal as it is, the following processings are performed. That is, data obtained as a result of a multiplex processing of A/D converted values of the first type of MUSE signals or data A/D converted at a rate which is double of the second type MUSE signal is converted in rate corresponding to recording/reproducing frequency and phase of the recording/reproducing device. By thus providing rate-converted digital data to the recording/reproducing device, a MUSE signal can be recorded in a frame-lock state. Also, it is possible to reproduce a MUSE signal by applying a conversion opposite to that in the recording operation and use the same as a MUSE signal for simulation. Furthermore, as the frame-lock is possible, recorded data can be extracted and readily processed in frame units to perform quality evaluation of the MUSE signal by using a computer. Further scope of applicability of the present invention will become apparent from the detailed description given hereinafter. However, it should be understood that the detailed description and specific examples, while indicating preferred embodiments of the invention, are given by way of illustration only, since various changes and modifications with the spirit and scope of the invention will become apparent to those skilled in the art from this detailed description.

BRIEF DESCRIPTION OF THE DRAWINGS

The present invention will become more apparent from the following detailed description of the present invention when taken in conjunction with the present drawings, which are given by way of illustration only, and thus are not limitative of the present invention.

DESCRIPTION OF THE PREFERRED EMBODIMENTS

Figure 1:
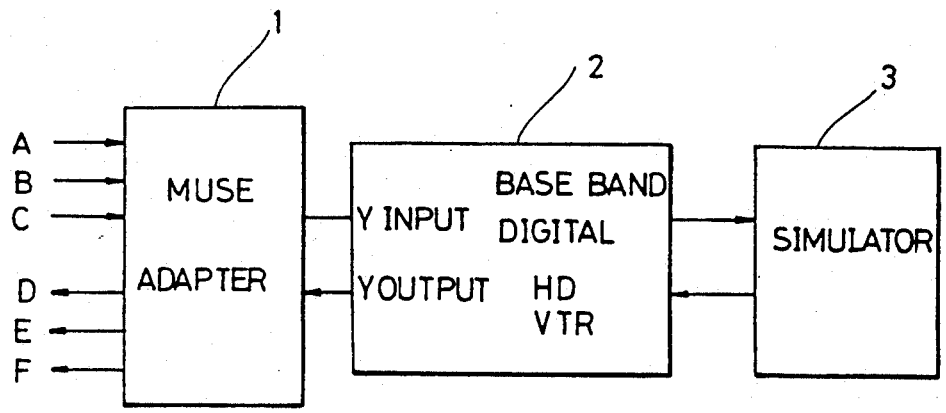
FIG. 1 is a block digram illustrating a first embodiment of the present invention.

FIG. 1 is a diagram illustrating one embodiment of a MUSE signal digital recording/reproducing apparatus according to the present invention. Referring to the figure, the MUSE signal digital recording/reproducing apparatus includes a MUSE adaptor 1, a HDVTR 2 and a simulator 3. A-F denote MUSE signals, respectively.

In recording, MUSE adaptor 1 converts externally inputted MUSE signals A and B or a MUSE signal C into digital data corresponding to the recording/reproducing frequency and phase of HDVTR 2 and applies the digital data to a luminance signal input terminal Y of VTR 2. During reproduction, muse adaptor 1, it performs conversion opposite to that during recording for the data from a luminance signal output terminal Y of HDVTR 2 to output MUSE signals D and E or a MUSE signal F. When a first type of MUSE signals A and B are simultaneously inputted, muse adaptor 1 A/D converts the MUSE signal A and B with sample frequency 16.2 MHz and quantization characteristic 10 bits and converts the A/D converted data into 32.4 MHz × 10 bits by multiplex processing. Also, when a second type of MUSE signal C is inputted, muse adaptor 1 performs A/D conversion with sample frequency of 32.4 MHz and quantization characteristic of 10 bits.

HDVTR 2, which can record and reproduce effective lines and effective picture elements of a high definition television signal, is used for recording/reproducing a MUSE signal, for example, converted in rate by MUSE adaptor 1 in this embodiment.

Simulator 3 captures recorded digital data of a MUSE signal in HDVTR 2 and applies predetermined processings to produce a new signal, or makes an image by the captured digital data displayed in a monitor not shown to evaluate quality of a MUSE signal, for example.

Figure 2:
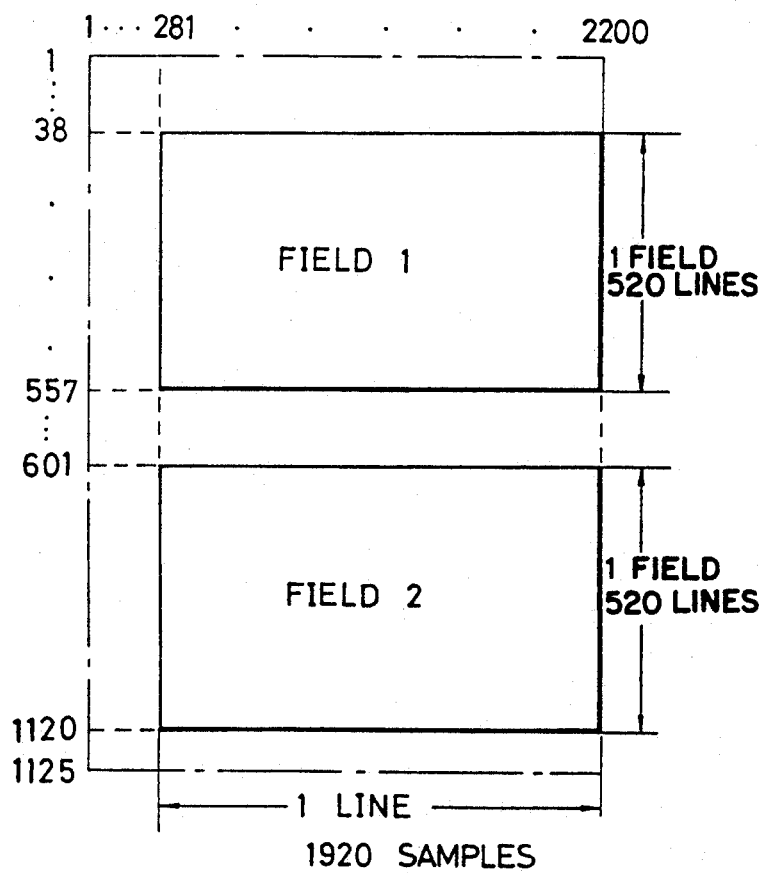
FIG. 2 is a diagram for describing a recording format of a HDVTR.

Next, HDVTR 2 will be described in further detail. HDVTR 2 can record/reproduce effective lines and effective picture elements of a high definition television signal as stated above. In HDVTR 2 used in this embodiment, the sample frequency is 74.25 MHz and the quantization characteristic is 8 bits, wherein one frame is recorded with frequency of 30 Hz which is the same as frame frequency of a high definition television signal. The recording format is shown in FIG. 2. A portion surrounded by an alternate long and short dash line in FIG. 2 indicates one frame of a high definition television signal. The number of lines per one frame of a high definition television signal is 1125 and the number of samples per one line is 2200. The lines Number 1-38 and 557-601 include vertical synchronizing pulse and the like, and the lines Number 1120-1125 include a control signal and the like. The samples Number 1-281 include horizontal synchronizing pulses and the like. A portion surrounded by a solid line indicates effective lines and sample values recorded in HDVTR 2. That is to say, information of an image is recorded in lines Number 38-557, 601-1120 and samples Number 281-2200 in a high definition television signal. Accordingly, the recording capacity of HDVTR 2 is 1920×1040 byte/frame.

Next, details of MUSE adaptor 1 will be described referring to the block diagram of FIG. 3. MUSE adaptor 1 performs A/D conversion for simultaneously inputted of MUSE signals A and B of the first type with sample frequency 16.2 MHz and quantization characteristic of 10 bits, and multiplex-processes the A/D converted values to 32.4 MHz 10 bits. Also, for MUSE signal C, muse adaptor 1 performs A/D conversion with sample frequency 32.4 MHz and quantization characteristic 10 bits. The quantity of information of a MUSE signal sampled by MUSE adaptor 1 and the record capacity of HDVTR 2 are shown in Table 1. The information quantity and record capacity are obtained from the above-mentioned signal rates.

TABLE 1

| Information Quantity of Muse signal | Record Capacity of VTR |
|---|---|
| 16.2 MHz, 10 bit × 2 = 40.5 Mbyte/sec | 74.25 MHz, 8 bit = 59.90 Mbyte/sec |

From Table 1, it is recognized that the HDVTR 2 has record capacity which is enough for recording a MUSE signal of 32.4 MHz and 10 bits without loss of data.

Figure 3:
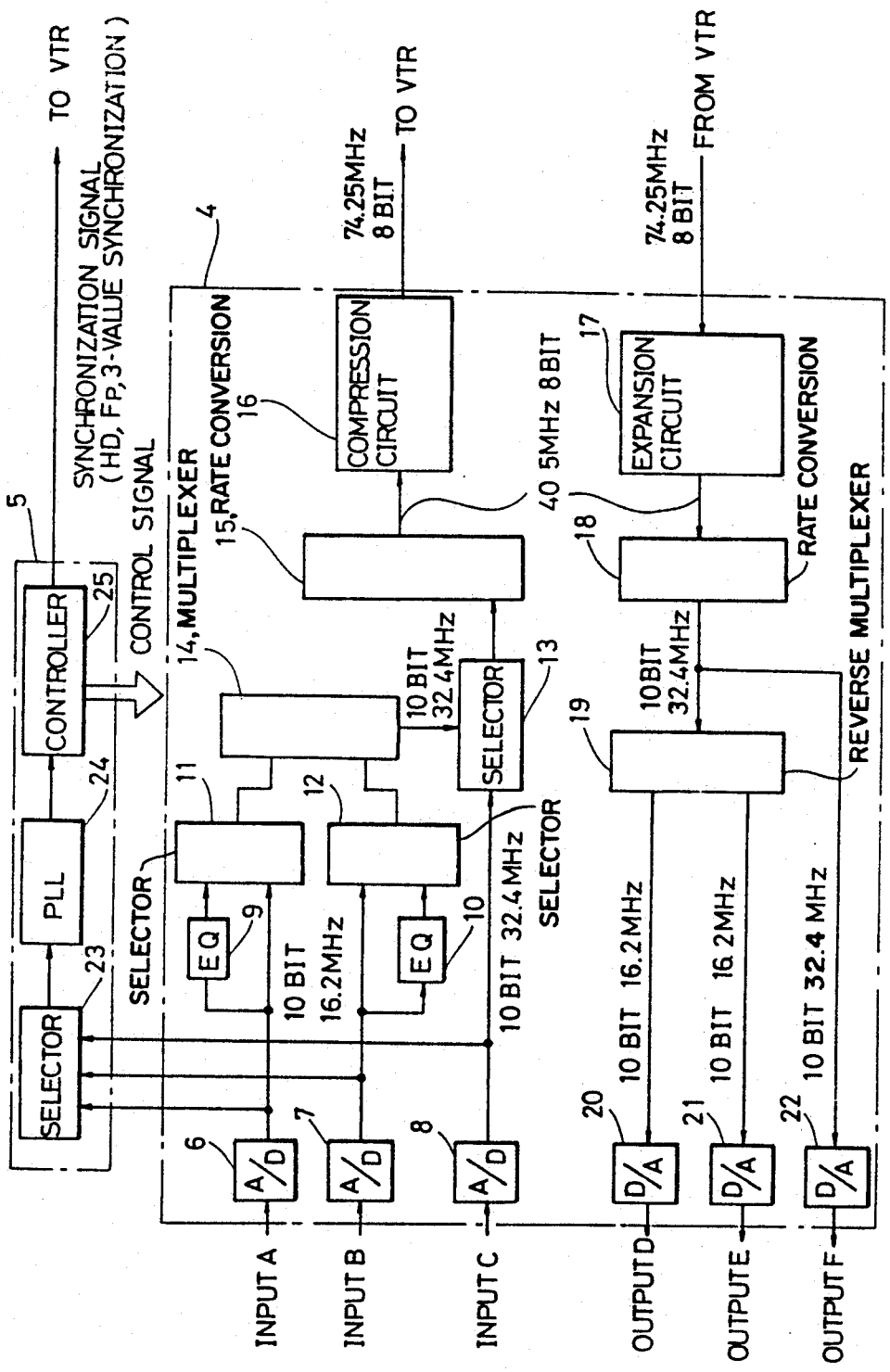
FIG. 3 is a block diagram illustrating details of a MUSE adaptor.

Referring to FIG. 3, MUSE adaptor 1 includes a signal processing device 4 for converting MUSE signals A and B or a MUSE signal C into data of 74.25 MHz 8 bits, and a control device 5 for detecting a synchronization signal from an A/D converted value of a MUSE signal and controlling signal processing device 4 and HDVTR 2 on the basis of the detected synchronization signal. Signal processing device 4 includes A/D converters 6, 7, 8; equalizers 9, 10; selectors 11, 12, 13; a multiplexer 14; a rate converter 15 connected to an output of the multiplexer; a compression circuit 16 connected to an output of rate converter 15; an expansion circuit 17 provided with digital data from HDVTR 2; a rate converter 18 connected to an output of expansion circuit 17; a reverse multiplexer 19 for processing an output of rate converter 18; and D/A converters 20, 21, 22 connected to reverse multiplexer 19 and rate converter 18. The control device 5 includes a selector 23, a PLL (Phase Locked Loop) circuit 24 and a control 25.

Next, operation of the MUSE signal digital recording/reproducing apparatus shown in FIGS. 1 through 3 will be described. MUSE signals A, B of the first type are respectively converted into digital data of 16.2 MHz 10 bits by A/D converters 6, 7. The A/D converted data are provided to control device 5 and also provided to selectors 11, 12 and equalizers 9, 10. The data provided to control device 5 is applied to PLL circuit 24 through selector 23, synchronized in phase with a record/reproduce clock signal of HDVTR 2 by PLL circuit 24, and applied to controller 25 thereafter. Controller 25 provides synchronization signals (a horizontal pulse, a frame pulse, a three-value synchronization signal, and so forth) for controlling HDVTR 2 on the basis of a signal synchronized in phase from PLL circuit 24, and also outputs a control signal for controlling signal processing device 4.

The selectors 11 and 12 select A/D converted values equalized by equalizers 9, 10 or outputs of A/D converters 6, 7, respectively. The data selected by selectors 11 and 12 are compressed to 32.4 Mhz, 10 bits by multiplexer 14 and then applied to selector 13.

Figure 4:
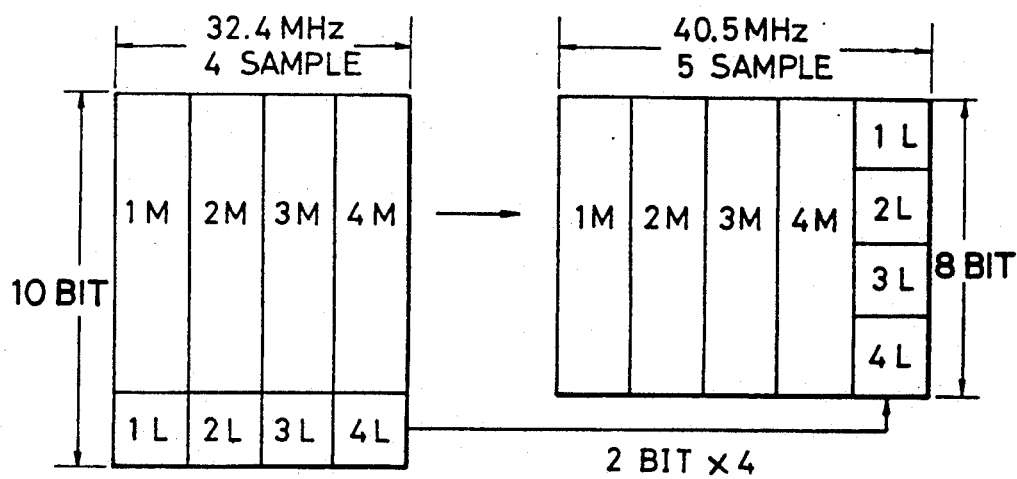
FIG. 4 is a diagram for describing a rate converting system of a rate converter.

Also, the second type of MUSE signal C, after being converted into a digital signal with sample frequency 32.4 MHz and quantization characteristic 10 bits by A/D converter 8, is applied to selector 13. Selector 13 selects one of data compressed by multiplexer 14 and an output of A/D converter 8, and provides it to rate converter 15. Rate converter 15 converts the rate of the applied digital data as shown in FIG. 4. That is to say, rate converter 15 places the lower 2 bits in the data of 32.4 MHz, 10 bits×4 clocks at the fifth clock to convert it into data of 40.5 MHz, 8 bits×5 clocks.

Figure 5:
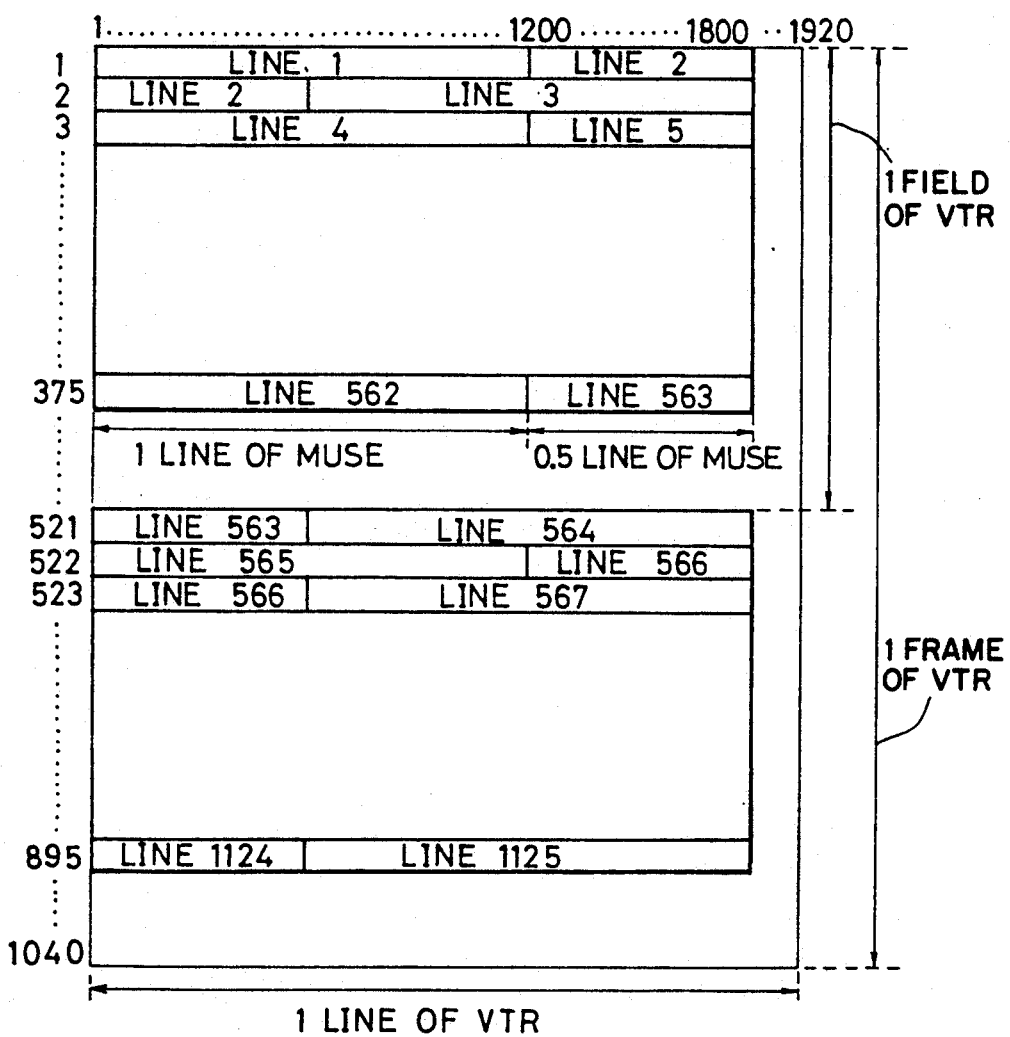
FIG. 5 is a diagram for describing a recording format of a compression circuit.

The rate-converted data is applied to compression circuit 16 and recorded into compression circuit 16 by such format as shown in FIG. 5. That is to say, a MUSE signal for 1.5 lines is recorded per one line of HDVTR 2. One line of MUSE signal has 1200 samples because a MUSE signal of 480 samples is converted into data of 960 samples which is a doubled rate and further a sample for 4 clocks is converted into a sample of 5 clocks. Thus, data of 40.25 MHz recorded in compression circuit 16 is compressed by being read out with 74.25 MHz and converted into input rate of VTR 2.

Figure 6:
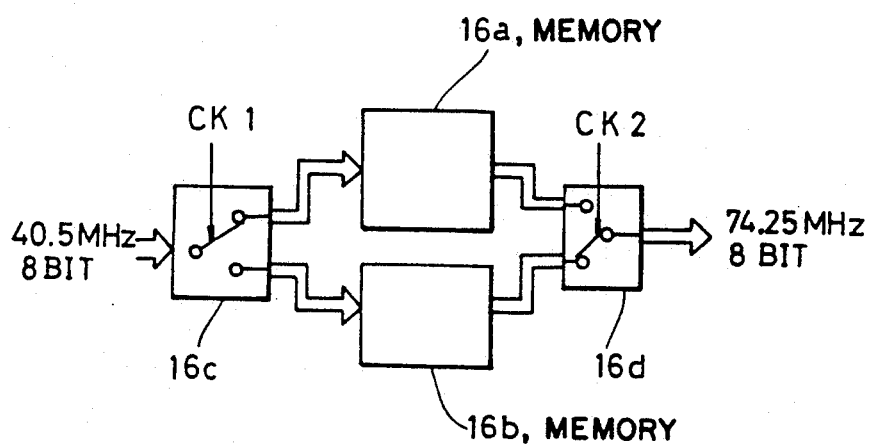
FIG. 6 is a specific block diagram of a compression circuit.
Figure 7:
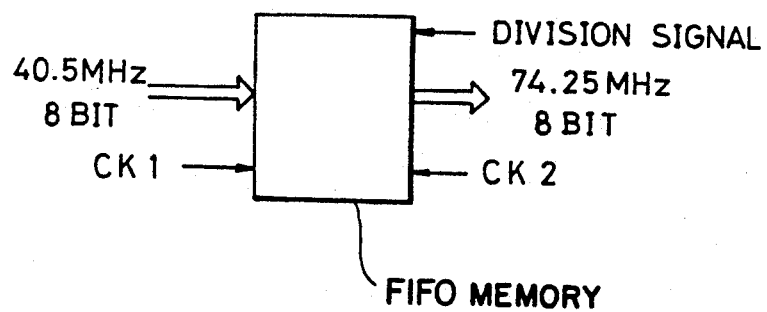
FIG. 7 is a block diagram illustrating a modification of a compression circuit.

The data compressing operation will be described in more detail with respect to FIG. 6. FIG. 6 is a block diagram illustrating a specific example of compression circuit 16. The compression circuit 16 includes memories 16a and 16b having storage capacity of data for 1 field, a switch circuit 16c switching through a write clock CK1 (one of control signals) from control device 5, and a switch circuit 16d switching in response to a read clock CK2 from control device 5. By introducing such a structure, compression circuit 16 writes a signal from rate converter 15 in response to write clock CK1 with 40.5 MHz into memory 16a or 16b and reads out data written into memory 16a or 16b delimiting it for each 1.5 line in response to read clock CK2 with 74.25 MHz. Instead of two memories as shown in FIG. 6, a field memory of first-in first-out system may be employed as shown in FIG. 7.

HDVTR 2 provided with data compressed by compression circuit 16 is in a synchronization state by synchronization signals (a horizontal pulse, a frame pulse, a 3-value synchronization signal and so forth) from control device 5. In this synchronization state, data from compression circuit 16 are sequentially recorded. The data thus recorded in HDVTR 2 corresponds to a MUSE signal in field units, so that it is possible to extract data for each unit and process the same with simulator 3. During reproduction, by performing conversion opposite to that in recording, an original MUSE signal can be recovered, and when it is processed by a simulator, the processed data can be D/A converted to produce a MUSE signal.

Although a case in which HDVTR 2 introduces the external synchronization system has been described in the above description, in a certain HDVTR, synchronization is implemented by combinations of $FF_H$, $OO_H$ (8 bit data). More specifically, when 8 bits of data come in the order of $FF_H$, $OO_H$, $OO_H$, it is recognized as a synchronization signal. In this case, synchronization with the HDVTR can not be provided by the MUSE adaptor of FIG. 3.

Figure 8:
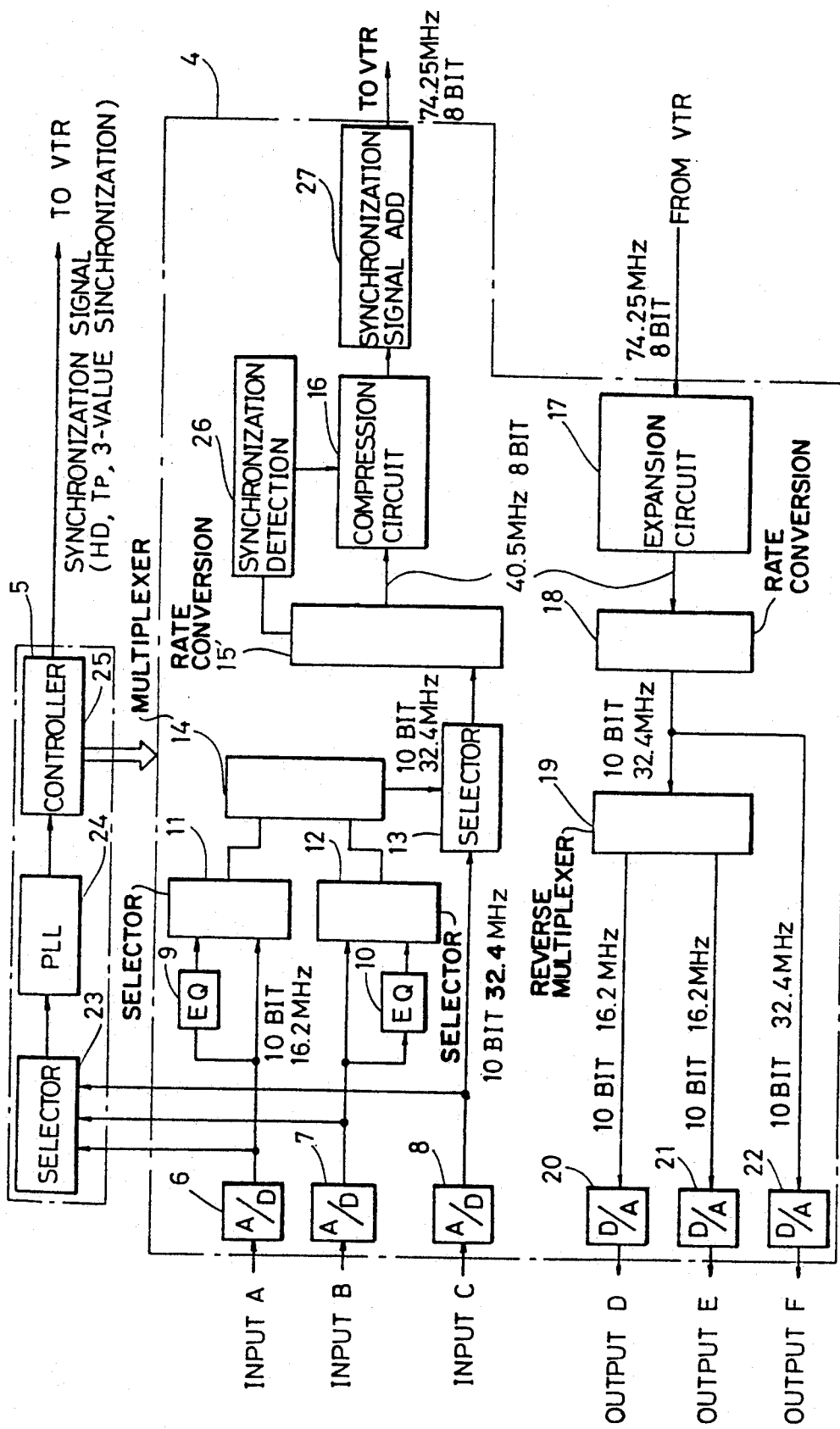
FIG. 8 is a block diagram illustrating a modified example of a MUSE adaptor.
Figure 9:
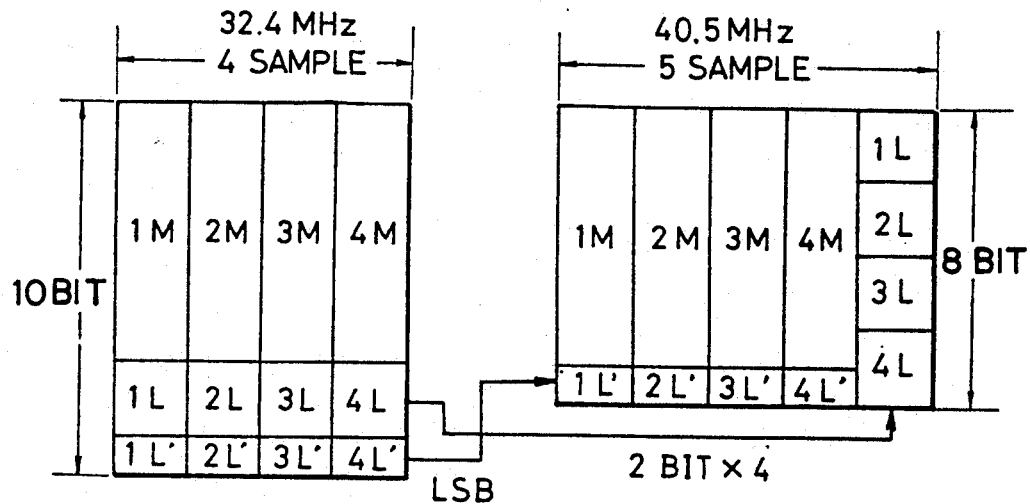
FIG. 9 is a diagram for describing a rate converting system of the MUSE adaptor shown in FIG. 8.
Figure 10:
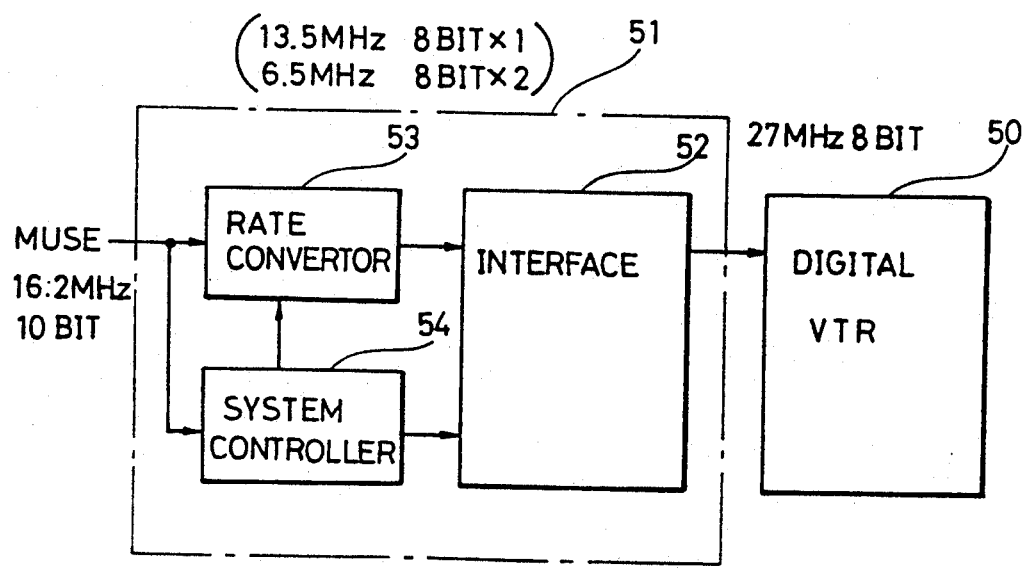
FIG. 10 is a block diagram of a conventional MUSE signal recording system.
Figure 11:
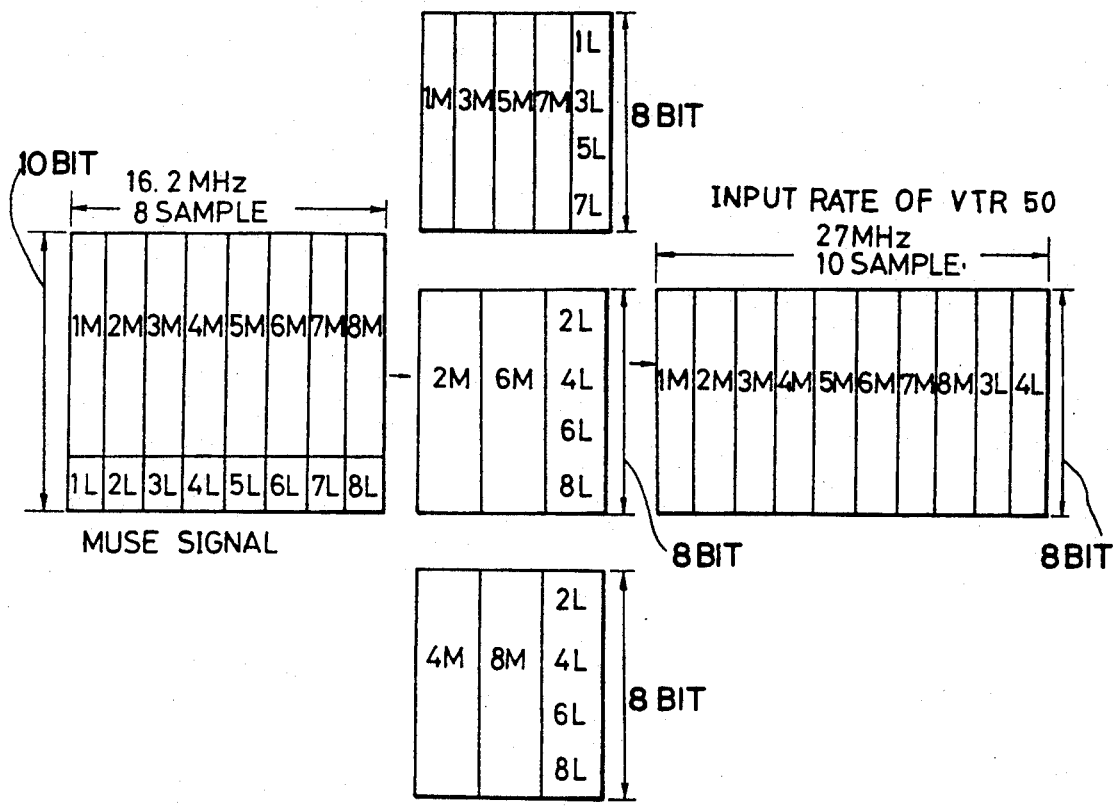
FIG. 11 is a diagram for describing a rate converting system of the system shown in FIG. 10.
Figure 12:
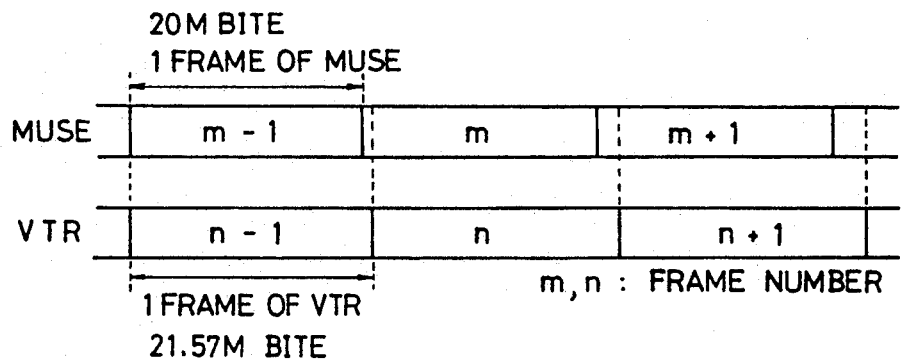
FIG. 12 is a diagram illustrating recording format to be recorded in a VTR by the system of FIG. 10.

FIG. 8 is a block diagram of a MUSE adaptor used for a HDVTR which provides synchronization by such data combinations, and FIG. 9 is a diagram for describing rate conversion of the MUSE adaptor of FIG. 8.

Referring to FIG. 8, the MUSE adaptor and the MUSE adaptor of FIG. 3 are different in that it includes a rate converter 15' which combines bits in a way different from that in FIG. 4, a synchronization detecting circuit 26 for detecting whether 8 bits of data from rate converter 15' is of a combination of $FF_H$, $OO_H$, $OO_H$, and a synchronization signal adding circuit 27 for adding a synchronization signal ($FF_H$, $OO_H$, $OO_H$) to an output of compression circuit 16. The same characters are allotted to the same circuits as those in FIG. 3, and description thereof is not be repeated.

Next, operation of the MUSE adaptor shown in FIG. 8 will be described. Data selected by selector 13 is converted as shown in FIG. 9 by rate converter 15'. That is, in data of 32.4 MHz, 10 bits×4, the second lowest bit and the third lowest bit are placed at the fifth clock for conversion into data of 40.5 MHz, 8 bits×5. If the converted data is of the order of the above-mentioned combination, one of two $OO_H$ is converted into $O1_H$ to break the combination of synchronization, and then it is provided to HDVTR 2. Then, $FF_H$, $OO_H$, $OO_H$ is added between compressed data (for example, between lines or between fields), which is recorded in HDVTR 2. When such conversion is made, the lowest bit or the second lowest bit of data of 10 bits is affected, but the image quality is not visually affected.

In the embodiment of FIGS. 8 and 9, a MUSE signal can also be digitally recorded substantially as it is similarly to the embodiment of FIGS. 1-7. Also, the recorded data can be read out to be used as a signal source for simulation process evaluation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A MUSE signal digital recording/reproducing apparatus for converting a MUSE signal into a digital signal and recording the digitally converted MUSE signal, and for reproducing the recorded digitally converted MUSE signal, comprising:

recording/reproducing means capable of digitally recording a high definition television signal;

at least two first A/D converting means, each of said A/D converting means for converting a respective externally produced synchronizing MUSE signal of a first type with a sample signal synchronized with one of said MUSE signals of a first type and with predetermined quantization characteristic;

multiplex-converting means for converting respective output data of said at least two first A/D converting means into doubled frequency signals by multiplex processing;

second A/D converting means for A/D converting an externally produced MUSE signal of a second type with frequency double said sample signal;

selection means for selecting one of a multiplex-processed output signal of said multiplex-converting means and an output signal of said second A/D converting means;

rate converting means for converting a rate of a selected signal output said selection means to correspond to a recording/reproducing frequency and phase of said recording/reproducing means and for supplying said converted selected signal to said recording/reproducing means for recording onto a recording medium;

extraction means for extracting said MUSE signals of a first type or said MUSE signal of a second type from a recorded signal reproduced from said recording medium by said recording/reproducing means; and control means for producing a control signal for controlling said rate converting means and said recording/reproducing means on the basis of an output of said at least two first A/D converting means for said second A/D converting means.

2. The MUSE signal digital recording/reproducing apparatus according to claim 1, wherein said recording/reproducing means comprises a video tape recorder means capable of recording/reproducing an effective line and an effective picture element of a high definition television signal.

3. The MUSE signal digital recording/reproducing apparatus according to claim 2, wherein said video tape recorder means has a recording format for recording one frame with a frequency the same as a frame frequency of the high definition television signal.

4. The MUSE signal digital recording/reproducing apparatus according to claim 3, wherein said video tape recorder means further comprises synchronization means for synchronizing said video tape recorder means with a synchronization signal included in the high definition television signal, and said rate converting means comprises frequency/phase conversion means for converting the rate of said selected signal output from said selection means to correspond to recording/reproducing frequency and phase characteristics of said recording/reproducing means.

5. The MUSE signal digital recording/reproducing apparatus according to claim 4, wherein said rate converting means further comprises compression means for compressing said converted selected signal.

6. The MUSE signal digital recording/reproducing apparatus according to claim 5, wherein said compression means comprises at least two memory means each having storage capacity for one field said converted selected signal being written into each of said at least two memory means and said written converted selected signal being read therefrom in response to write and read control signals from said control means.

7. The MUSE signal digital recording/reproducing apparatus according to claim 6, wherein said read control signal has a frequency higher than said write control signal.

8. The MUSE signal digital recording/reproducing apparatus according to claim 5, wherein said compression means comprises memory means of a first-in first-out type.

9. The MUSE signal digital recording/reproducing apparatus according to claim 3, wherein said video tape recorder means comprises synchronization means for detecting a predetermined data combination included in the high definition television signal and recognizing it as a synchronization signal, and said rate converting means comprises combination data detecting means for detecting the predetermined data combination and data re-combining means for re-combining the predetermined data combination into another data.

10. The MUSE signal digital recording/reproducing apparatus according to claim 1, wherein said extraction means comprises:

rate reconverting means for converting a reproduced signal from said recording medium in frequency and phase into a reconverted signal of the doubled frequency;

demultiplex-converting means, coupled to said rate reconverting means, for demultiplexing and converting said reconverted signal into respective signals of the frequency of said sample signal and with said predetermined quantization characteristic;

at least two first D/A converting means, coupled to said demultiplex-converting means, each D/A converting means converting one of said respective signals with said sample signal to respectively output said MUSE signals of a first type; and second D/A converting means, coupled to said rate converting means, for D/A converting said reconverted signal with said frequency double said sample signal to output said MUSE signal of a second type.

11. The MUSE signal digital recording/reproducing apparatus according to claim 10, wherein said rate reconverting means further comprises expansion means for expanding said reproduced signal prior to conversion into said reconverted signal.

12. A method of operating a MUSE signal digital recording/reproducing apparatus having recording/reproducing means capable of digitally recording and reproducing a high definition television signal, comprising the steps of:

A/D converting each of at least two respective externally produced synchronous MUSE signals of a first type with a sample signal synchronized with one of the MUSE signals of the first type and with predetermined quantization characteristic;

converting each of the A/D converted MUSE signals of a first type into doubled frequency signals by multiplex processing;

A/D converting an externally produced MUSE signal of a second type with frequency double the sample signal into a converted signal;

selecting one of the doubled frequency signals or the converted signal as a selected signal;

converting the selected signal into a rate converted signal which corresponds to a frequency and phase of the recording/reproducing means;

recording the rate converted signal onto a recording medium; and extracting the MUSE signals of a first type or the MUSE signal of a second type from a reproduced signal of the recording medium.

13. The method of operating a MUSE signal digital recording/reproducing apparatus according to claim 12, wherein said step of extracting the MUSE signals comprises the steps of:

reconverting the reproduced signal, in frequency and phase into a reconverted signal of the double frequency;

demultiplex-converting the reconverted signal into demultiplexed signals of the frequency of the sample signal and with the predetermined quantization characteristic;

D/A converting each of the demultiplexed signals with the sample signal to output each of the respective externally produced synchronous MUSE signals of a first type; and D/A converting the reconverted signal with the frequency double the sample signal to output the externally produced MUSE signal of a second type.

14. The method of operating a MUSE signal digital recording/reproducing apparatus of claim 13, wherein said step of reconverting the reproduced signal further comprises the step of expanding the reproduced signal prior to said reconverting.

* * * * *